US 9,151,423 B2

(12) United States Patent
Walz et al.

(10) Patent No.: US 9,151,423 B2
(45) Date of Patent: Oct. 6, 2015

(54) CONNECTING SOCKET FOR FILTER HOSES

(75) Inventors: Stefan Walz, Freiberg (DE); Anton Kreiner, Reisbach (DE); Michael Maier, Reisbach (DE); Fabian Wagner, Moeglingen (DE)

(73) Assignee: MANN+HUMMEL GMBH, Ludwigsburg (DE)

(*) Notice: Subject to any disclaimer, the term of this patent is extended or adjusted under 35 U.S.C. 154(b) by 277 days.

(21) Appl. No.: 13/453,081

(22) Filed: Apr. 23, 2012

(65) Prior Publication Data

US 2012/0267891 A1    Oct. 25, 2012

(30) Foreign Application Priority Data

Apr. 21, 2011    (DE) .......................... 10 2011 018 621

(51) Int. Cl.
| F16L 21/06 | (2006.01) |
| F16L 33/207 | (2006.01) |
| B01D 46/00 | (2006.01) |
| B01D 46/02 | (2006.01) |
| F16L 33/22 | (2006.01) |

(52) U.S. Cl.
CPC ......... *F16L 33/2075* (2013.01); *B01D 46/0004* (2013.01); *B01D 46/02* (2013.01); *F16L 33/225* (2013.01)

(58) Field of Classification Search
USPC .............. 285/81–82, 239, 242, 245, 259, 285/330–331, 255; 55/490, 492
See application file for complete search history.

(56) References Cited

U.S. PATENT DOCUMENTS

| 36,410 | A | * | 9/1862 | Jucket ...................... 285/255 X |
| 628,765 | A | * | 7/1899 | Collette ......................... 285/81 |
| 1,035,680 | A | | 5/1912 | Boesel |
| 1,370,289 | A | * | 3/1921 | Crippen ...................... 285/250 |
| 2,861,649 | A | * | 11/1958 | Junkmann |
| 3,115,353 | A | * | 12/1963 | Previati |
| 4,073,632 | A | | 2/1978 | Reinauer et al. |
| 4,317,471 | A | * | 3/1982 | King, Sr. ...................... 137/798 |
| 5,586,791 | A | * | 12/1996 | Kirchner et al. .............. 285/179 |
| 5,967,563 | A | * | 10/1999 | Lavis et al. ....................... 285/7 |
| 6,170,882 | B1 | * | 1/2001 | Prest ............................... 285/12 |
| 6,749,233 | B2 | * | 6/2004 | Ohya ........................ 285/255 X |
| 2002/0020156 | A1 | | 2/2002 | Goerg |

FOREIGN PATENT DOCUMENTS

DE            4134679 A1    10/1991

* cited by examiner

*Primary Examiner* — Gregory Binda
(74) *Attorney, Agent, or Firm* — James Hasselbeck

(57) ABSTRACT

A connecting socket for a filter hose has an inner part having a first contact surface extending in a circumferential direction on the inner part and an outer part having a second contact surface extending in a circumferential direction on the outer part. A contact section of a filter hose is contacting the first and second contact surfaces when secured on the connecting socket. The outer part has an outer sleeve that is pushed onto the inner part such that the contact section of the filter hose is clamped between the first and second contact surfaces.

8 Claims, 6 Drawing Sheets

CONNECTING SOCKET FOR FILTER HOSES

CROSS REFERENCE TO RELATED APPLICATIONS

This application claims the benefit under 35 USC 119 of German patent application 102011018621.2 filed Apr. 21, 2011 and which is hereby incorporated by reference in its entirety.

BACKGROUND OF THE INVENTION

The present invention concerns a connecting socket for filter hoses, in particular for fully flexible air filter hoses, and a filter hose connection comprising such a connecting socket.

Filter hoses, in particular fully flexible air filter hoses, are used in order to separate by means of the filter medium of the filter hose a raw air (unfiltered air) side from a clean air (filtered air) side. In use, the air is conveyed from the raw air side through the filter medium to the clean air side wherein contaminants in the air are deposited at the raw air side on the filter medium of the air filter hose. The filtration effect is determined by the material of the air filter hose, in particular by its pore size. Filter hoses of various cross-sections are known. In addition to round cross-sections also folded bellows-shaped filter hoses are known, in particular with rectangular cross-section.

For attachment of the filter hoses on housings, it is known in the prior art to use a connecting socket. The filter hoses are usually pushed onto such connecting sockets. Spring rings or the like are then pushed onto the filter hose in order to secure the filter hose on the connecting socket. For sealing the filter hose on the connecting socket, it is common to employ seals between the connecting socket and the filter hose.

The connecting sockets of the prior art have the disadvantage that seals for sealing the filter hose on the connecting socket are provided between connecting socket and filter hose; this leads to additional costs. Moreover, the action of simply pushing the filter hose onto the connecting socket provides for an insufficient stability of the connection of filter hose and connecting socket with the risk that the filter hose can become detached from the connecting socket when under load.

SUMMARY OF THE INVENTION

It is therefore an object of the present invention to provide a connecting socket for filter hoses that provides for a stable and seal-tight connection of filter hose and connecting socket and that can be produced inexpensively.

In accordance with the present invention, this is achieved in that the connecting socket for filter hoses comprises an inner part and an outer part wherein the inner part and the outer part each have a contact surface for contacting a contact section of the filter hose, wherein the contact surfaces extend about the circumference of the inner and outer parts, respectively. The outer part has moreover an outer sleeve that can be pushed onto the inner part in such a way that the contact section of the filter hose is clamped between the contact surfaces.

In one embodiment of the invention, the inner part comprises an inner through opening for passing through the filter hose. In particular, the filter hose has an open end and a closed end wherein the open end is attached to the connecting socket and the filter hose passes in the direction toward its closed end through the through opening of the inner part. Preferably, the inner part comprises additionally an outer contact surface extending about its circumference for contacting a contact section of the filter hose that is folded over a first end of the inner part in outward direction.

By folding over an end section of the filter hose about the first end of the inner part, a particularly fast and seal-tight connection between filter hose and connecting socket can be achieved without providing an additional seal. The connecting socket has moreover an outer part that has an outer sleeve and that is pushed in such a way onto the inner part that the folded-over section of the filter hose is clamped between the outer sleeve and the contact surface of the inner part.

By folding over the end section of the filter hose, a great resistance is provided relative to pulling out the filter hose from the connecting socket because when pulling the filter hose out of the connecting socket the folded-over contact section must be greatly deformed. At the same time, the two layers of the filter hose with the interposed inner part provide a kind of labyrinth seal with particularly high seal-tightness. By means of the outer part, the stability of the connection between the filter hose and the connecting socket is further improved and the seal-tightness is increased. In this context, the outer sleeve pushes the folded-over end section or contact section of the filter hose against the contact surface of the inner part in such a way that a seal-tight connection between contact surface and filter hose is formed.

According to a preferred embodiment, the outer part has an inner sleeve that is connected by a transition section with the outer sleeve; the inner sleeve is arranged within the outer sleeve, is spaced radially from the outer sleeve, and extends at least partially in the area of the contact surface within the inner part. In this way, the filter hose extending within the inner part can be pressed radially against the inner part; this causes an additional sealing action of the filter hose relative to the inner part because an additional contact surface that is subjected to contact pressure is provided. Moreover, the tensile load of the connection of the filter hose and connecting socket is increased because the folded-over section is stabilized in that the filter hose is pressed against the inner part on both sides in radial direction.

Preferably, the inner part and preferably also the outer part are formed as a two-part radially joined injection-molded plastic part. Accordingly, the parts can be produced inexpensively by means of an injection mold that can be of a divided configuration. For example, as a material, thermoplastic or thermoset synthetic materials are used, in particular polyethylene, polyamide or polypropylene.

Preferably, the contact surface is at least partially designed as a knurled surface. In this way, the force transmission counteracting sliding of the filter hose off the contact surface is improved. Moreover, for example, an undulated rippled knurled surface can increase the seal-tightness between filter hose and contact surface.

The contact surface can at least partially be designed as a sawtooth profile whose first, more flat tooth flanks are oriented in the direction toward the first end and whose second steeper flanks are facing away from the first end. The sawtooth profile forms thus a kind of barbed hook surface that avoids sliding of the pushed-on filter hose off the contact surface. At the same time, the flat flanks ensure easy pushing of the filter hose onto the sawtooth profile contact surface. Conceivable is also an embodiment of the contact surface as an undulated profile.

Preferably, in addition a locking connection between the inner part and the outer part for locking the outer part pushed onto the inner part is provided. For example, for this purpose on the inner part at least one barbed hook is arranged that locks in a springy fashion in a recess in the outer part. In this way, the outer part can be locked on the inner part in the pushed-on positioned so that the connection between connecting socket and filter hose is positionally fixed.

Alternatively, the connection between the inner part and the outer part is detachably designed. In particular, a releasable looking connection, a snap-on connection, a plug connection for the like can be used.

Preferably, the transition section with which the inner sleeve of the outer part is connected with the outer sleeve is elastically designed. In this way, the inner sleeve and the outer sleeve can elastically spread apart with spring-back function so that their spacing is enlarged. This enables an elastic clamping action acting on the filter hose. Filter hoses with different material thickness can thus be securely held on one and the same connecting socket.

Preferably, on the inner part a coupling element is provided at the second end, in particular a bayonet connection or a locking element. In this way, the connecting socket can be releasably mounted on a housing.

Preferably, the inner part or the outer part is provided with a circumferentially extending seal for a seal-tight connection on a fluid conduit.

For example, a seal receptacle in the form of a recess that extends about the circumference and receives a sealing ring may be provided. The seal can furthermore be integrated into the inner part or the outer part.

The object of the present invention is further solved in that the filter hose connection comprises a connecting socket with the features disclosed above. A filter hose at least partially extends within the inner part and the outer sleeve of the outer part is pushed such onto the inner part that the section of the filter hose is clamped between the contact surfaces of the inner part and the outer part.

Thus, the filter hose extends through the inner through opening of the inner part and is folded about a first end of the inner part in outward direction. This folded-over section of the filter hose is resting seal-tightly on the outer contact surface that is extending about the circumference of the inner part. The outer part with the outer sleeve is pushed onto the inner part such that the folded-over section of the filter hose is clamped between the outer sleeve and the contact surface of the inner part.

The filter hose can be glued onto the contact surface. It is also possible that the inner part is glued to the outer part or fused thereto.

In a further embodiment, the connecting socket or the filter hose connection comprises a coupling element, for example, in the form of a bayonet closure, for coupling the connecting socket to a component, for example, a fluid supply tube. Combustion air for an internal combustion engine, but also ambient air to be filtered by a passenger compartment filter, is conceivable as a fluid in this context.

Further possible implementations of the invention comprise also combinations that are not explicitly mentioned of the features of embodiments or embodiment variants described above or in the following. In this connection, a person of skill in the art will also add individual aspects as improvements or supplements to the respective basic form of the invention.

Further embodiment of the invention are subject matter of the dependent claims as well as of the embodiments of the invention disclosed in the following. Moreover, the invention will be explained in more detail in the following with the aid of embodiments, reference being had to the attached Figures.

DESCRIPTION OF THE PREFERRED EMBODIMENTS

Figure 1:
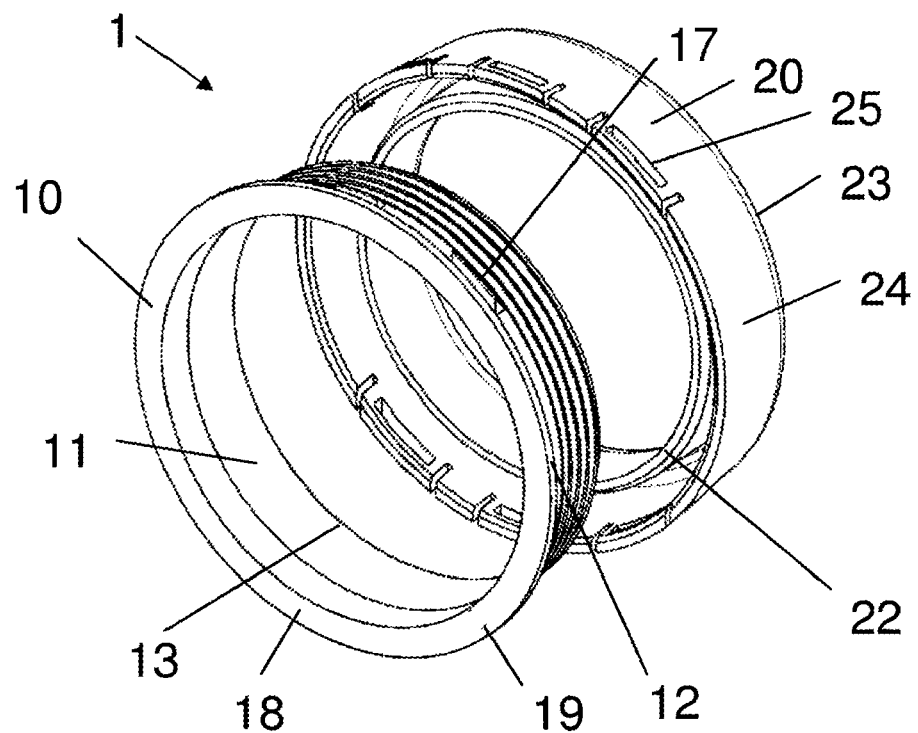
FIG. 1 shows a perspective illustration of a connecting socket according to a first embodiment.

FIG. 1 shows a schematic perspective illustration of a connecting socket 1 according to a first embodiment. The connecting socket 1 comprises an inner part 10, illustrated to the left in the drawing, and an outer part 20, illustrated to the right in the drawing. The outer part 20 has an outer sleeve 24 that has a transition section 23 which is passed into an inner sleeve 22. When the inner part 10 is axially inserted into the outer part 20, the inner part 10 extends partially with its first end 13 between the outer sleeve 24 and the inner sleeve 22.

Figure 2:
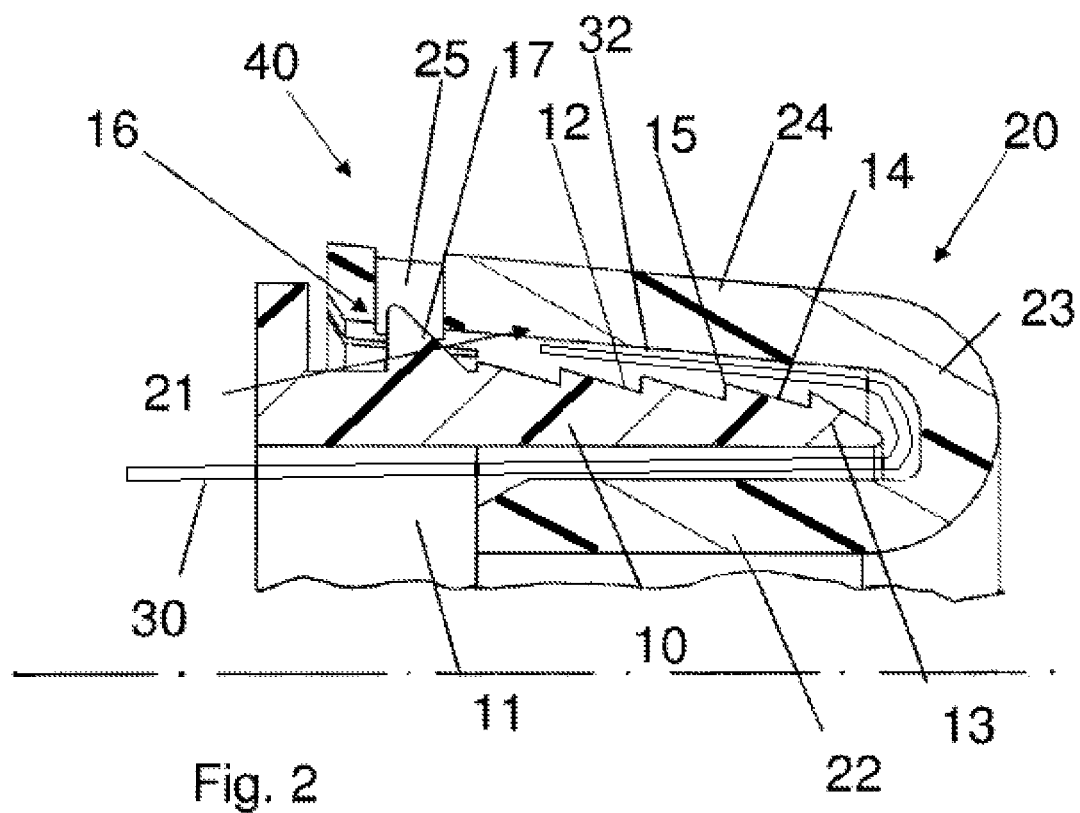
FIG. 2 shows a cross section illustration of a filter hose connection with a connecting socket according to the first embodiment.

The inner part 10 has a through opening 11 that is provided in order to receive a filter hose 30 (filter hose 30 is only illustrated in FIG. 2). The filter hose 30 is pushed through the through opening 11 and its end section is then folded over about the first end 13 of the inner part 10. The folded-over end section 32 of the filter hose 30 forms a contact section that is then resting on a contact surface 12 of the inner part 10. When the inner part 10 and the outer part 20 of the connecting socket 1 are joined, the folded-over end section 32 of the filter hose 30 is pressed by the outer sleeve 24 of the outer part 20 against the contact surface 12.

The transition section 23 that connects the sleeve 24 with the inner sleeve 22 is elastically formed in this embodiment in order to enable an elastic or springy spreading-apart action of the inner sleeve 22 relative to the outer sleeve 24 and to thereby secure the filter hose elastically. In this embodiment of the connecting socket 1, a locking connection 16 (compare FIG. 2) between the inner part 10 and the outer part 20 is realized that enables locking of the inner part 10 and the outer part 20 in the inserted joined position. The locking connection 16 is comprised of barbed hooks 17 on the inner part 10 that engage locking recesses 25 on the outer part 20. In this way, the inner part 10 and the outer part 20 are held together when they are locked with each other. Moreover, at the second end 18 of the inner part 10, coupling elements 19 in the form of bayonet elements are provided that enable the detachable connection of the connecting socket 1 on a housing. The connecting socket 1 enables a pull-resistant and seal-tight attachment of the filter hose 30 without requiring an additional seal. The sealing action is realized in this context by the filter hose 30 itself in that the filter hose 30 is clamped between the inner part 10 and the outer part 20 of the connecting socket.

FIG. 2 shows a cross section illustration of a filter hose connection 40 with a connecting socket 1 according to the first embodiment. FIG. 2 illustrates only one half, i.e., the upper half, of the connecting socket 1 shown in section. The connecting socket 1 comprised of inner part 10 and outer part 20 is illustrated in the joined state.

The contact surface 12 extends between the outer sleeve 24 and the inner sleeve 22 of the outer part 20. In this inserted position the barbed hooks 17 on the inner part 10 engage the recesses 25 of the outer part 20 so that the inner part 10 and the outer part 20 are locked with each other and do not become detached from each other. Conceivable is also an embodiment with a detachable locking connection 16, for example, in order to exchange the filter hose 30. A filter hose 30 is passed through the through opening 11 in the inner part 10 and the end section is folded over about the end 13 of the inner part 10 so that a folded-over end section 32 is formed as a contact section which is resting on the contact surface 12 of the inner part 10. The contact surface 12 has first flat tooth flanks 14 that enable easy pushing of the filter hose 30 across the contact surface 12. The second steeper tooth flanks 15 on the contact surface 12 form a kind of barbed hooks that are to prevent sliding of the filter hose 30 off the contact surface 12. In this way, the filter hose 30 can be pushed on easily and is still secured well against sliding off the contact surface 12.

The inner sleeve 22 and the outer sleeve 24 of the outer part 20 are connected to each other by an elastic transition section 23 so that, by an elastic springy action they can initially spread apart and then clamp the filter hose 30 between the contact surface 12 and the outer sleeve 24 as well as between inner sleeve 22 and inner part 10. In this way, a high seal-tightness of the filter hose connection 40 is achieved without this requiring additional seals. The sealing medium is formed by the filter hose 30 itself. The sealing action is in this context filtration-tight and not necessarily fluid-tight. This means that soiled air upon potentially passing through the intermediate space between the outer sleeve 24 and the inner part 10 must pass through the filter medium of the filter hose 30. In this way, even for a coupling of the inner part 10 with the outer part 20 that is not air-tight, it is prevented that contaminated air can pass between the two parts 10, 20 into the clean air area.

Figure 3:
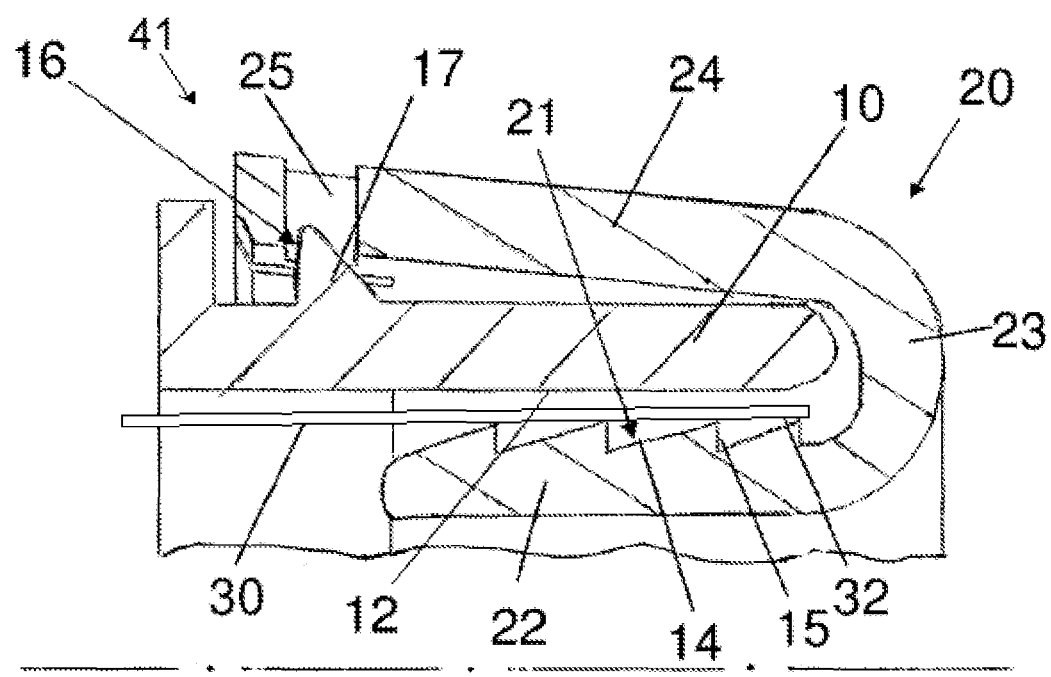
FIG. 3 is a cross section illustration of a filter hose connection with a connecting socket according to a second embodiment.

FIG. 3 shows a cross section illustration of a filter hose connection 41 with a connecting socket 1 according to a second embodiment. In this connection, the end section 32 of the filter hose 30 is not folded over but clamped between contact surfaces 12 and 21 of the inner part 10 and of the outer part 20. In comparison to the first embodiment of FIGS. 1 and 2, first flat tooth flanks 14 that allow for easy pushing of the filter hose 30 across the contact surface 21 and second steeper tooth flanks 15 are provided on the inner sleeve 22 of the outer part 20. In this way, sliding of the filter hose 30 off the contact surfaces 12, 21 is prevented.

Figure 4:
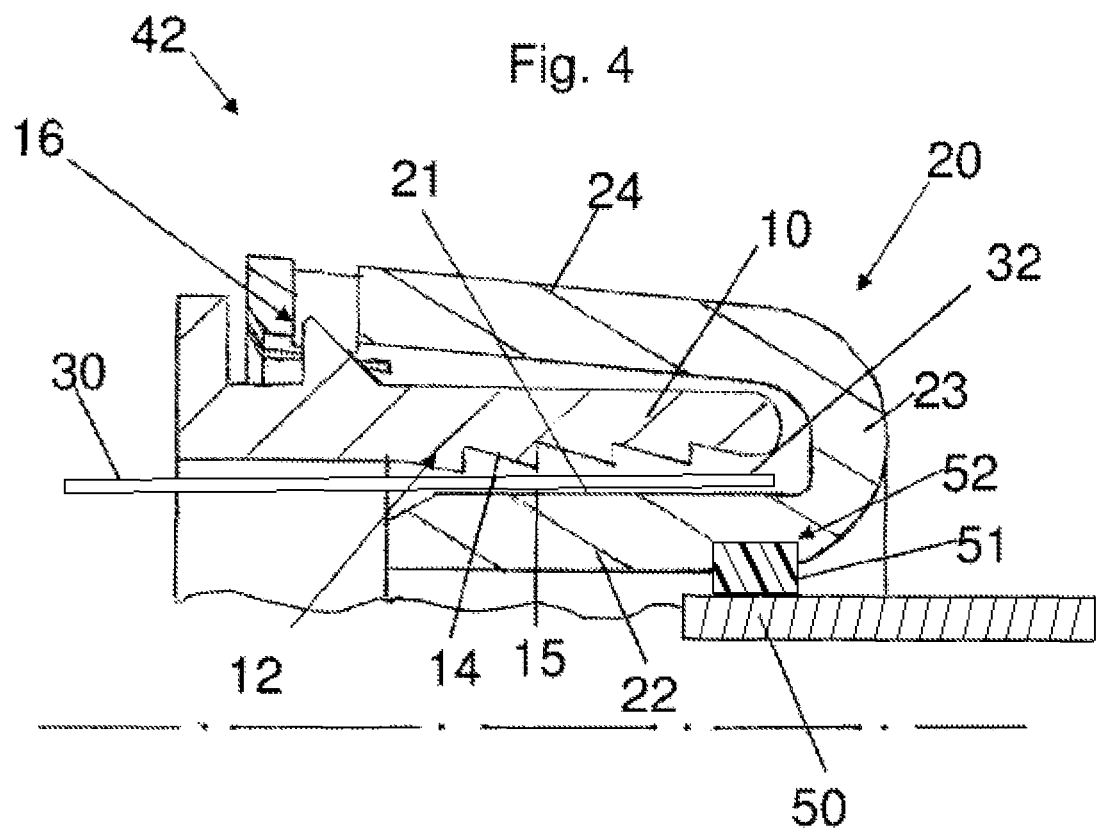
FIG. 4 is a cross section illustration of a filter hose connection with a connecting socket according to a third embodiment.

FIG. 4 shows a cross section illustration of a filter hose connection 42 with a connecting socket 1 according to a third embodiment. In comparison to the second embodiment of FIG. 3, flat tooth flanks 14 and steeper tooth flanks 15 are arranged on the inner side of the inner part 10. The end section 32 of the filter hose 30 is thus positioned between the smooth contact surface 21 of the outer part 20 which is provided on the inner sleeve 22 and the knurled contact surface 12 of the inner part 10 that is provided, for example, with teeth 14, 15.

FIG. 4 shows moreover a seal receptacle 52 for a circumferentially extending seal 51. The seal 51, for example, designed as a sealing ring, extends about the inner circumference of the inner sleeve 22 in such a way that, upon pushing the filter hose connection 42 onto a supply tube 51, a seal-tight connection is provided. FIG. 4 shows an external component, for example, a connecting tube 50, to the right of the drawing. The component 50 can also be a part of a filter housing wherein the seal 51 provides a closure or sealed connection between a raw air side and a clean air side.

The seal 51 is provided in particular during manufacture of the connecting socket either on the outer part (24, 23, 22) or the inner part 10.

Figure 5:
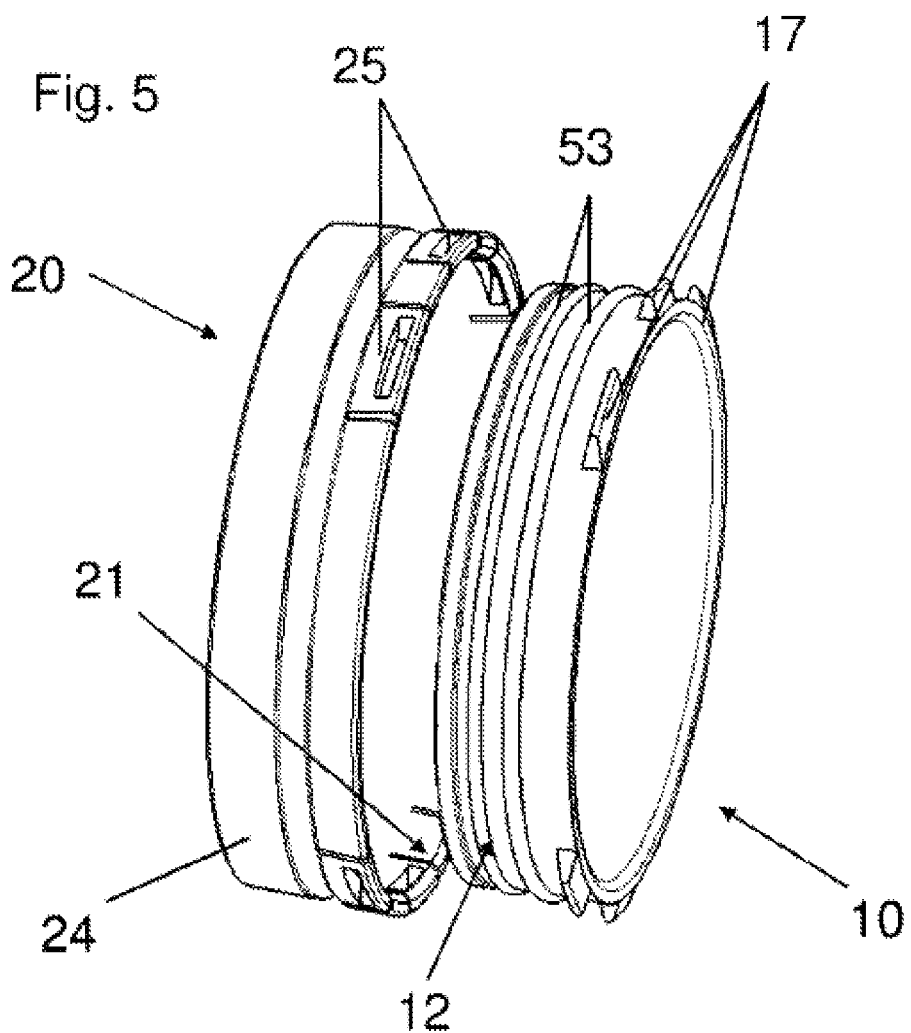
FIG. 5 is a perspective illustration of a connecting socket according to a fourth embodiment.
Figure 6:
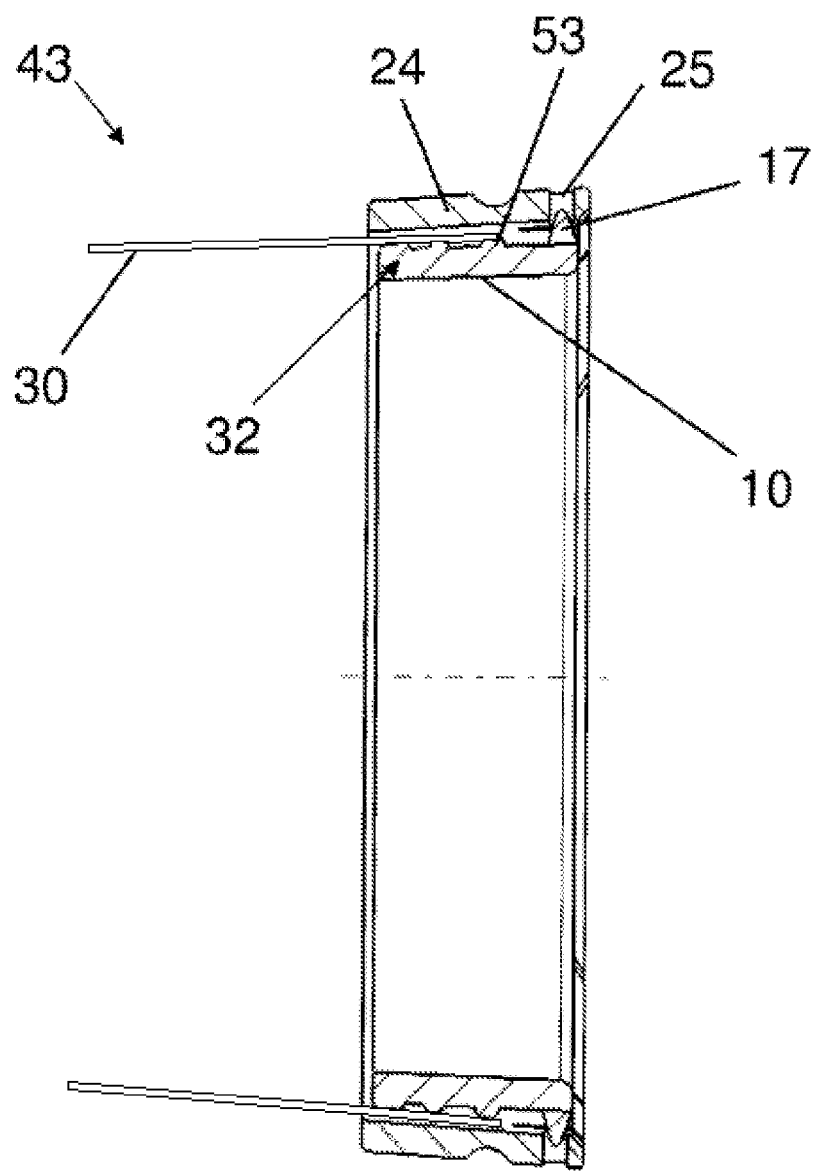
FIG. 6 is a cross section illustration of a filter hose connection with a connecting socket according to the fourth embodiment.

FIG. 5 shows a further embodiment for a connecting socket in perspective view. FIG. 6 illustrates a section illustration of a filter hose connection 43. The connecting socket 43 comprises an inner part 10 and an outer part 20 that are each designed like a sleeve. The two parts 10, 20 can be pushed into each other so that between an (outer) contact surface 12 of the inner part 10 and an (inner) contact surface 21 of the outer part 20 an end section 32 of a hose-shaped filter medium 30 can be clamped.

In order for the two sleeve-shaped parts 10, 20 with intermediately positioned end section 32 of the filter medium of the filter hose 30 to be positionally secured, the inner part 10 is provided on the outer side with a locking nose 17. The locking nose 17 engages in the inserted state a slot 25 of the sleeve 24 of the outer part 20. The perspective illustration of FIG. 5 shows that several slots 25 are arranged on a circumferential line of the exterior of the outer part. The slots 25 are arranged opposite each other on the circumferential line such that the outer part 20 can be produced in a one-part injection mold without undercuts. Similarly, corresponding locking noses 17 are provided on an outer circumferential line of the inner part 10.

In order for the end section 32 of the filter medium 30 to be secured by a secure clamping action between the contact surfaces 12, 21, the inner part 10 is provided with several ribs 53 extending on the outer circumference. In principle, corresponding ribs can also be arranged on the outer part 20 so as to project inwardly. Accordingly, the filter end section 32 is secured safely in a radial direction and the two parts 10, 20 are fixedly snap-connected or locked with each other.

Even though the present invention has been explained with the aid of preferred embodiments, the invention is not limited to these embodiments but can be modified in many ways. For example, the connecting socket and the filter hose connection can also be designed without the inner sleeve connected by means of the transition section with the outer sleeve.

While specific embodiments of the invention have been shown and described in detail to illustrate the inventive principles, it will be understood that the invention may be embodied otherwise without departing from such principles.

What is claimed is:

1. A connecting socket for a filter hose, the connecting socket comprising:
   a filter hose having porous circumferential wall of filter medium, the filter hose filtering air flow through the filter hose wall, the filter hose having an end received into and securely clamped by said connecting socket;
   an inner part having an open interior formed by a through-opening extending through a first end of the inner part;
      wherein the inner part has a first contact surface as an radially outer surface of the inner part, the first contact surface extending about an outer circumference of said inner part;
   an outer part received over the first contact surface at the radial exterior of the inner part, the outer part wrapping around the first end of the inner par extending into the open interior of the inner part, the outer part having
      an outer sleeve extending circumferentially about the first contact surface on the radial exterior of the inner part, the outer sleeve having a second contact surface facing the first contact surface;
      an inner sleeve projecting into the through-opening into the interior of the inner part, said inner sleeve radially spaced from said outer sleeve; and a transition section arranged at the first end and connecting said inner sleeve and said outer sleeve;

wherein the filter hose has a contact section, the contact section formed by a portion of the filter hose that is folded over a first end of said inner part in a U-shaped fold in a radially outward direction onto the first contact section;

wherein the filter hose contact section is arranged between and rests upon the first contact surface and the second contact surface;

wherein said outer part is pushed onto said inner part such that the contact section of the filter hose is clamped between said first and second contact surfaces;

wherein the outer sleeve of the outer part includes a locking recess extending through the outer sleeve from a radial interior to a radial exterior of the outer sleeve;

wherein the inner part includes a barbed hook, the barbed hook formed on the radial outer surface of the inner part;

wherein the barbed hook protrudes into and engages the locking recess of the outer sleeve forming a locking connection that locks the inner part to the outer part into an inserted joined position.

2. The connecting socket according to claim 1, wherein said inner part; said outer part; or said inner and said outer parts are embodied as a two-part radially joined component.

3. The connecting socket according to claim 2, wherein said inner part; said outer part; or said inner and said outer parts are in the form of an injection-molded plastic part.

4. The connecting socket according to claim 1, wherein said first contact surface or said second contact surface is at least partially provided with a knurled surface area.

5. The connecting socket according to claim 1, wherein said first contact surface at least partially is embodied as a sawtooth profile having first flat tooth flanks that are oriented in a direction of a first end of said inner part and having second steeper tooth flanks that are oriented away from said first end of said inner part.

6. The connecting socket according to claim 1, wherein said transition section is elastically formed to enable an elastic springy spreading-apart action of the inner sleeve relative to said outer sleeve, thereby elastically clamping the filter hose against and between said inner and outer sleeves, wherein said barbed hook elastically engages said locking recess.

7. The connecting socket according to claim 1, wherein said inner part or said outer part is provided with a circumferential seal that provides a seal-tight connection when the connecting socket is connected to a fluid conduit.

8. The connecting socket according to claim 1, wherein the connecting socket does not have a seal member, the seal is forming only by the clamped filter hose forming a tight sealing fit or seal tight engagement with the connecting socket without an additional seal between the filter hose and connecting socket.

* * * * *